United States Patent
Galand

(10) Patent No.: US 7,471,627 B2
(45) Date of Patent: Dec. 30, 2008

(54) NETWORK LEVEL ADMISSION CONTROL APPARATUS FOR A COMMUNICATIONS NETWORK HAVING A SUB-IP LEVEL PROTOCOL

(75) Inventor: Damien Galand, Chaville (FR)

(73) Assignee: Alcatel, Paris (FR)

( * ) Notice: Subject to any disclaimer, the term of this patent is extended or adjusted under 35 U.S.C. 154(b) by 752 days.

(21) Appl. No.: 10/705,837

(22) Filed: Nov. 13, 2003

(65) Prior Publication Data

US 2004/0170183 A1  Sep. 2, 2004

(30) Foreign Application Priority Data

Nov. 14, 2002  (FR)  .................................. 02 14227

(51) Int. Cl.
*H04L 12/26* (2006.01)
(52) U.S. Cl. ...................................... 370/230; 370/401
(58) Field of Classification Search ........................ None
See application file for complete search history.

(56) References Cited

U.S. PATENT DOCUMENTS

| 6,282,194 | B1 * | 8/2001 | Cheesman et al. ........... 370/356 |
| 2002/0097674 | A1 | 7/2002 | Loke | |
| 2003/0187986 | A1 * | 10/2003 | Sundqvist et al. ............ 709/225 |
| 2005/0190721 | A1 * | 9/2005 | Pershan ....................... 370/328 |

FOREIGN PATENT DOCUMENTS

EP  0 999 674 A1  5/2000
EP  1 089 506 A2  4/2001

OTHER PUBLICATIONS

D. Goderis et al, "Towards an Integrated Solution for Multimedia Over IP", Electrical Communication, Alcatel, Brussels, Belgium, No. 2 Apr. 1, 2001, pp. 97-104, XP001065319.

* cited by examiner

*Primary Examiner*—Firmin Backer
*Assistant Examiner*—Rhonda Murphy
(74) *Attorney, Agent, or Firm*—Sughrue Mion, PLLC

(57) ABSTRACT

Apparatus (D) is dedicated to network level admission control for a communications network (NSIP) using a protocol at sub-IP level and including border routers (BR3-*k*) interconnected by links associated with known characteristic resources and managed by a network management system (NMS3). This connection apparatus comprises control means (CM) that firstly are fed by the network management system (NMS3) with data representative of the links between the border routers of the sub-IP first network (NSIP) and of the associated resources, and that secondly, on receiving a request to transfer a call via the sub-IP first network (NSIP), which call is associated with at least one service criterion and designates another communications network (NIP2) that is connected to the sub-IP network and that is of a different type, are capable of determining from the received data whether resources are available that satisfy the service criterion(a) associated with the call to be transferred, and if so of forwarding the call transfer request to the control apparatus (S2) connected to the network management system (NMS2) which manages the designated other network (NIP2).

10 Claims, 1 Drawing Sheet

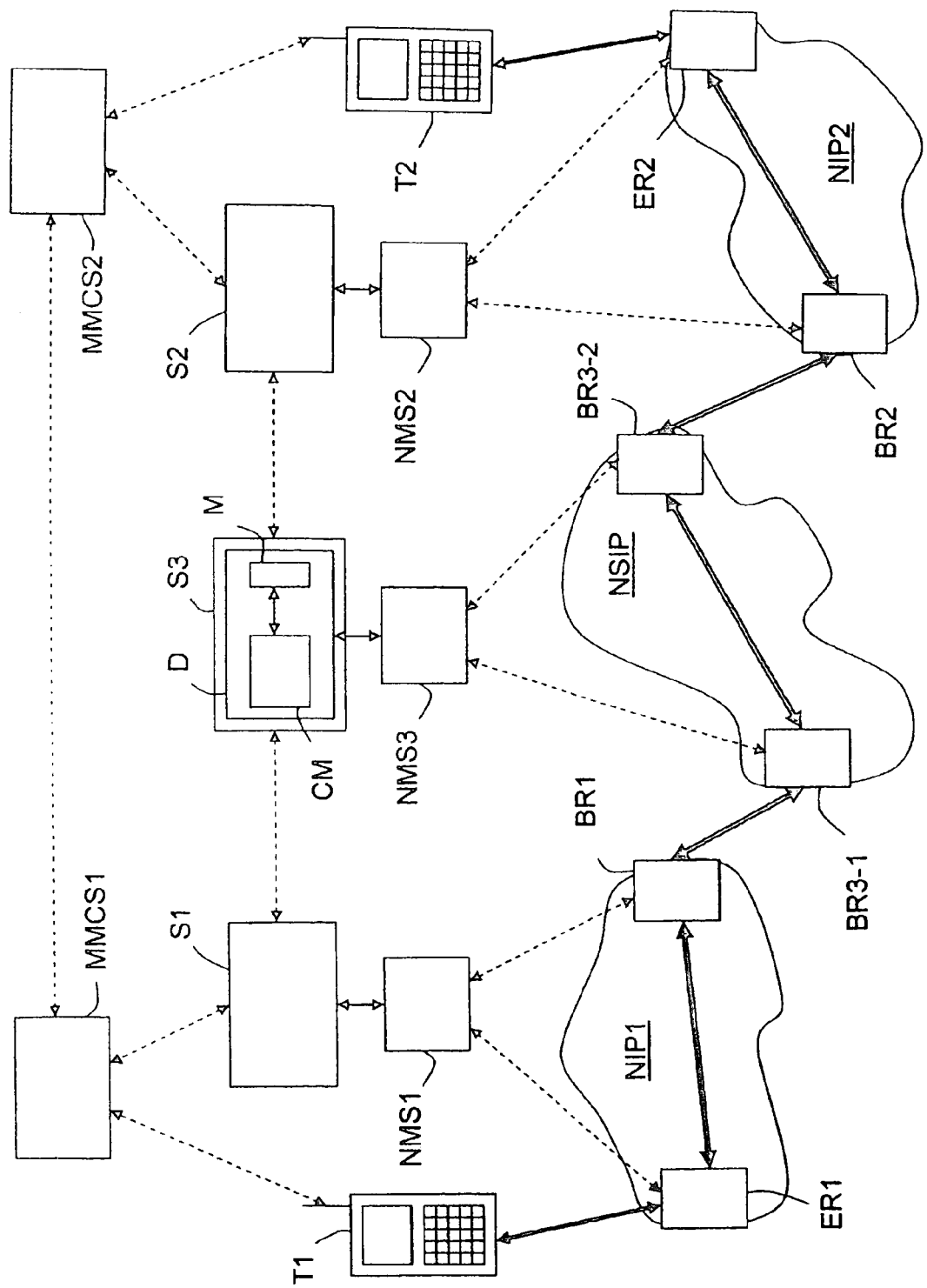
Sole Figure

NETWORK LEVEL ADMISSION CONTROL APPARATUS FOR A COMMUNICATIONS NETWORK HAVING A SUB-IP LEVEL PROTOCOL

BACKGROUND OF THE INVENTION

1. Field of the Invention

The invention relates to the field of communications between terminal via communications networks, and more particularly it relates to ensuring continuity of service for calls that involve networks of different types.

2. Brief Description of the Related Art

A call is often set up between two remote terminals via a plurality of communications networks that are connected to one another via edge routers or border routers. Setting up a call in this way generally presents no problem so long as the call is not associated with some particular level of service, or so long as continuity of service is not required in association with the call. However, this continuity of service situation is becoming less and less frequent because of the great variety of networks and network equipments.

Amongst the network equipment commonly in use and likely to coexist within a single call, mention can be made in particular of IP routers, routers with wavelength-division multiplexing such as dense wavelength-division multiplex (DWDM) devices, add-drop multiplexers (ADMs), photonic cross-connects (PXCs), or optical cross-connects (OXCs).

Similarly, amongst the networks commonly in use and likely to be involved in a call, mention can be made in particular of those which belong to the first family of networks known as "packet switching" networks and those belonging to the second family of networks known as "non-packing switching" networks.

The networks of the first family make use of protocols at level 3 in the open systems interconnection (OSI) layer model (also known as IP level protocols, or more simply Internet protocols (or IPs)). These constitute that which is commonly called the Internet.

Networks of the second family make use of protocols at level 2 in the OSI layer model (also known as sub-IP level protocol). The second family can also be subdivided into at least three sub-families. A first sub-family is constituted by networks using space-division switching, a second sub-family is constituted by networks using time-division multiplexing (TDM), as for example the synchronous optical network (SONET) and the synchronous digital hierarchy (SDH) network, and a third subfamily is constituted by networks using wavelength-division multiplexing (WDM).

In order to enable calls to be set up via different IP networks (belonging to the first family), proposals have been made to connect each network management system (NMS) which manages the equipment of an IP network to apparatus for controlling network level admission. On receiving a request to transfer, via its own network, a call associated with at least one service criterion and specifying another IP network connected to its own IP network, such control apparatus serves to verify whether there are available resources that are capable of satisfying the service criterion(a) associated with the call to be transferred. Thus, so long as such resources exist, the control apparatus can in turn forward the call transfer request to the control apparatus connected to the network management system managing the equipment of the designated IP network, so as to enable it to perform optional verification within its own IP network.

The term "request to transfer a call via a network" is used herein to designate the fact of using a first network to establish a "bridge" between two other networks, making available certain resources of one of the links within the first network.

By means of this type of control apparatus, it is thus possible to guarantee the continuity and the quality of service associated with a call when the IP networks involved in the call are different. However, it is also possible to guarantee security of service to a subscriber, where security of service consists in authenticating and/or encrypting a call.

However, there does not exist any known solution enabling continuity and quality of service to be guaranteed together with optional security of service associated within a single call when the call is set up over networks of different types, i.e. belonging to different sub-families of the second family (known as the sub-IP family) or belonging to different families.

An object of the invention is thus to remedy that drawback.

SUMMARY OF THE INVENTION

To this end, the invention provides apparatus dedicated to controlling network level admission for a set of communications networks comprising a first network with a protocol at sub-IP level (i.e. belonging to the second above-specified family), including border routers interconnected by links associated with resources of known characteristics and managed by a first network management system (NMS).

The connection apparatus is characterized by the fact that it comprises control means that firstly are fed by the network management system with data representative of the links between the border routers of the sub-IP first network and the associated resources, and that secondly, on receiving a request to transfer a call via the sub-IP first network, which call is associated with at least one service criterion and designates a second communications network that is connected to the sub-IP first network and that is of a different type (IP or sub-IP), are capable of determining from the received data whether available network resources exist that satisfy the service criterion(a) associated with the call to be transferred, and if so of forwarding the call transfer request to another control apparatus connected to the network management system (NMS) managing the designated second network, with said resources being booked only if there exist in each network involved by said call available resources that satisfy said service criterion.

It is thus possible to guarantee continuity of service and quality of service and possibly also security of service (encryption and/or authentication) associated with a call even when setting up the call involves networks of different types, i.e. belonging to different families or to different sub-families of the second family.

The service criterion is preferably selected from a group comprising at least quality of service, ability to protect/restore a link, and security of service. Ability to protect/restore a link is typically an indication of a guaranteed minimum delay for making protection/restoration resources available in the event of a fault in the network.

Also preferably, the control means may be arranged in such a manner as to store the received data in a memory in the form of a connectivity matrix between the various border routers of the sub-IP first network (it is this memory which is consulted in order to determine whether resources sufficient for the desired service are available in the sub-IP network).

In addition, the control means of the apparatus of the invention are preferably capable of being coupled to other control apparatus connected to the network management system (NMS) managing a third communications network connected to the sub-IP first network and of a different type (IP or sub-IP), and from which the call transfer request comes.

The invention also relates to network equipment, such as server, suitable for being connected to a network management system (NMS) managing a communications network using a protocol at sub-IP level and fitted with network level admission control apparatus of the type specified above.

Most particularly, although not exclusively, the invention applies to sub-IP communications networks selected from networks using space-division switching, WDM networks, TDM networks, and in particular SONET and SDH networks, and generalized multiprotocol label switching (GMPLS) networks.

BRIEF DESCRIPTION OF THE DRAWINGS

Other characteristics and advantages of the invention appear on examining the following detailed description and the sole accompanying FIGURE which is a diagram showing an example of a communications installation fitted with control apparatus of the invention. This FIGURE can contribute not only to describing the invention, but can also contribute to defining it, where appropriate.

DETAILED DESCRIPTION OF EXEMPLARY EMBODIMENTS

The communications installation shown by way of example in the sole FIGURE comprises three communications networks of different types. More precisely, in this example, the installation comprises firstly a first public data network using a protocol at level 3 of the OSI model (IP level protocol), referred to below as the first IP network (NIP1), a second public data network likewise using protocol at level 3 of the OSI model, referred to below as the second IP network (NIP2), and optionally of a type that is different from NIP1, and a third public data network using protocol at level 2 of the OSI model (i.e. a protocol at sub-IP level), referred to below as the sub-IP network (NSIP).

For example, the sub-IP network NSIP is a time-division multiplexed (TDM) network such as a SONET or an SDH network, for example. However, it could be any other type of level 2 sub-IP network, such as, for example, a network using space-division switching, or a WDM network, or a sub-IP network at so-called level "2.5", such as a GMPLS network.

The first IP network NIP1 is managed by a network management system (NMS1) of the NMS type coupled to a "network level admission control" server S1 also referred to as a network level admission controller. Each time this server S1 receives a request to transfer a call via the first IP network NIP1, the call being associated with at least one service criterion and designating another network (in this case NSIP) connected to the first IP network NIP1, the server S1 verifies whether there exist available network resources associated with the various previously-established links (established by NMS1) within the first IP network NIP1 between its different routers and satisfying the service criteria(on) associated with the call to be transferred, where the routers may be of the edge router type ER1 or of the border router type BR1.

The second IP network NIP2 is managed by a network management system (NMS2) of the NMS type, coupled to a network level admission control server S2 that is used, each time it receives a request to transfer a call via the second IP network NIP2 in association with at least one service criterion and designating another network connected to the second IP network NIP2, to verify whether available network resources exist in association with the various previously-established links (established by NMS2) within the second IP network NIP2 between its different routers and satisfying the criteria (on) associated with the call to be transferred, which routers may be of the edge router type ER2 or of the border router type BR2.

The term "service criterion" is used herein to mean any matter relating to the service associated with a call, in particular quality of service or ability to ensure service continuity (also referred to as protection/restoration) in the event of a problem occurring on a link, or indeed security of service.

Quality of service (QoS) is defined by the characteristics of a resource, such as, for example, the passband on offer or the quality of service level (gold, silver, or bronze) on offer. These quality of service levels are the result of classification performed on the basis of a certain number of parameters such as passband, delay, jitter, losses, and the like.

Continuity of service is defined by parameters such as the ability to provide protection from discontinuity of service. Specifically, while data is being transferred, it is conventional practice in the event of an "interruption" to require protection/restoration to be put into place within less than 50 milliseconds (ms), for example.

Security is the ability to encrypt and/or authenticate a connection between two points in a connection matrix. It is recalled at this point that security is considered as being a network resource. Furthermore, it is the NMSi which is in charge of informing the control server Si of the possibility of encrypting and/or authenticating a call between two points of the connection matrix.

Each NMSi of the IP network NIPi (in this case i=1 or 2) supplies the corresponding control server Si in static manner (in particular during pre-operational stages) with data representative of the links established between the various edge routers ER1 and border routers BRi of the IP network NIPi and of the resources associated with these links. This data subsequently makes it possible for the control server Si to memorize the occupation states of resources in its own IP network as a function of received service requests. Furthermore, the NMSi regularly informs the control server Si in such a manner as to enable it to keep its knowledge about the states of resources in correspondence with the real resources of the IP network. Thus, each control server Si knows at all times which resources are available in the IN network NIPi that it controls.

The sub-IP network NSIP is managed by a network management system (NMS3) of the NMS type coupled to network level admission control apparatus D, in this case included in a control server S3 connected to the control servers S1 and S2 of the first and second IP networks NIP1 and NIP2.

Furthermore, the sub-IP network NSIP is connected to the border routers BRi of the first and second IP networks NIP1 and NIP2 via at least some of its own border routers BR3-$k$ (in this case k=1 or 2).

The control apparatus D of the invention comprises a memory M fed by the NMS3 of the sub-IP network NSIP with network data representative of the links established between the various border routers BR3-$k$ (in this case k=1 or 2) of the sub-IP network NSIP and of the resources associated with these links. It is important to observe that this feeding of data to the memory takes place in an off-line type mode, independently of requests to verify the availability of resources or calls. As mentioned above, data is fed during a pre-operational stage, and also in real time throughout the lifetime of the network in question.

Furthermore, some of the network data fed to the memory M may specify a management mode applied by the server NMS3 to a link. Such management modes include in particular virtual private network (VPN) mode, optical VPN mode, and Internet protocol security (IPSec) mode.

The memory M also stores restoration data defining the network resources that are intended to replace other network resources in the event of a problem.

The data is preferably stored in the memory M in the form of a connectivity matrix defining all of the links established between the various border routers BR3-*k* of the sub-IP network NSIP, and the resources associated with these links together with their characteristics and their respective availability states, and also the restoration links and the associated resources.

The control apparatus D of the invention also comprises a control module CM coupled to the memory M and serving on each occasion it receives a request to transfer a call via the sub-IP network NSIP in association with at least one service criterion and designating another network (in this case NIP1 or NIP2) connected to the sub-IP network NSIP, to verify whether there exist available resources associated with the various previously-established links within the sub-IP network NSIP between its border routers BR3-*k* which satisfy the service criteria(on) associated with the call to be transferred.

The control apparatus D is capable of taking account of signaling specific to sub-IP networks coming from a multimedia call server (MMCS) or from some other control module (or control server Si) of a neighboring network to which its sub-IP network is connected. It is also capable of taking account of protection/restoration data dedicated to the sub-IP networks and information coming from two-directional communications matrices.

The control module CM and possibly also the memory M may be implemented in the form of electronic circuits ("hardware"), software or computer modules ("software"), or a combination of hardware and software.

An example of the use of the communications installation shown in the sole FIGURE is described below. In this example, it is assumed that a first communications terminal T1 seeks to exchange data with a second communications terminal T2, the data satisfying two service criteria, e.g. it is of the multimedia type and requires continuity of service to be ensured.

It is also assumed that the first and second terminals T1 and T2 are connected to public telephone networks (not shown) e.g. of the public land mobile network (PLMN) type such as a UMTS network or an i-Mode network. However, in a variant, they could be connected to a network of the public switched telephone network (PSTN) type or even directly to an IP network.

It is also assumed that the terminals T1 and T2 are mobile telephones. However they could be constituted, for example, by fixed or portable computers, fixed telephones, personal digital assistants (PDAs), or indeed any type of communications terminal capable of exchanging data with another terminal.

The first terminal T1 initially sends a request to its own telephone network UMTS1 requesting that a call be set up with the second terminal T2 in order to exchange multimedia data with continuity of service being ensured. The network UMTS1 then initiates a procedure for determining whether the second terminal T2 is available, and if so the path that will enable the call to be set up with said second terminal T2 while satisfying both of the required service criteria.

To do this, it interrogates its own server MMCS1 which acts at call signaling level in order to make sure that the two terminals T1 and T2 and the services associated therewith are compatible prior to attempting to establish a connection (there is no point in trying to establish a connection if the remote terminal (in this case T2) is busy or if the service requested by terminal T1 is not available, for example).

In the example described, it is assumed that the server MMCS1 has used a call-level signaling procedure to determine that the second terminal T2 is available and that it is available for the service requested by the first terminal T1. Consequently, it needs to use a connection-level signaling procedure to initiate verification of resource availability. To do this, it makes the connection to the control server S1 of the first IP network NIP1 in order to request it to verify whether it has available resources that satisfy the two service criteria requested by the first terminal T1 and enabling it to transfer the call towards the sub-IP network NSIP. In the example shown, by interrogating its connectivity matrix, the control server S1 observes that some of the resources of the link established between the edge router ER1 and the border router BR1 satisfy both requested service criteria.

Knowing that its IP network NIP1 is connected to the sub-IP network NSIP, the control server S1 forwards to its control server S3 the request to verify the availability of resources satisfying both service criteria requested by the first terminal T1 and enabling the call to be transferred to the second IP network NIP2.

This verification request is processed by the control module CM of the control apparatus D installed in the control server S3. The control module CM then interrogates the connectivity matrix stored in the memory M and, in the example shown, discovers that certain resources of the link established between the border routers BR3-1 and BR3-2 satisfy both requested service criteria.

Knowing that its own sub-IP network NSIP is connected to IP network NIP2, the control module CM instructs the control server S3 to forward to the control server S2 of the second IP network NIP2 the request to verify the availability of resources satisfying both service criteria requested by the first terminal T1 and enabling the call to be transferred to the network UMTS2.

In the example shown, the control server S2 interrogates its own connectivity matrix and determines that certain resources of the link established between the border router BR2 and the edge router ER2 satisfy both requested service criteria.

When resources are available, it is preferably not necessary for the control server S2 to warn the server MMCS2 of the network UMTS2. It is preferable that such a warning should be sent to the server MMCS1 in the event of resources not being available. Under such circumstances, the server MMCS1 then informs the server MMCS2 that the connection cannot be established.

In the example shown, since resources are available in all three transfer (or transit) networks involved (NIP1, NSIP, and NIP2), the server MMCS2 informs the server MMCS1 which in turn informs the network UMTS1. Naturally, when the first terminal T1 is directly connected to the IP network NIP1, the server MMCS1 informs T1 directly that it can connect with the second terminal T2. This terminates the procedure for verifying resource availability.

When resources satisfying both service criteria are available within the three networks involved in this case (NIP1, NSIP, and NIP2), resource reservation or booking can then be performed within each network and the connection between the first and second terminals T1 and T2 can be established via the edge router ER1 and the border router BR1 of the first IP network NIP1, the border routers BR3-1 and BR3-2 of the sub-IP network NSIP, and the border router BR2 and the edge router ER1 of the second IP network NIP2.

The procedure for setting up the call has then terminated and the two terminals T1 and T2 can begin to exchange multimedia data with the assurance of benefiting from continuity of service throughout the duration of the call. In the event of a problem in any one of the links, they are guaranteed that the transfer network concerned (NIP1, NSIP, or NIP2) will immediately make equivalent resources available to them. In other words, the invention ensures that the continuity of service associated with a call is indeed ensured throughout the path connecting a calling terminal to a called terminal, and that this occurs regardless of the number of transfer (or transit) networks involved.

The invention is not limited to the embodiments of the installation, control apparatus, and control server described above, merely by way of example, but covers any variant that the person skilled in the art might imagine within the ambit of the following claims.

Thus, the invention is neither limited to the example combination of telephone networks and data networks shown, nor is it limited to the number of networks described, providing at least two data networks are of different types and at least one of them is a sub-IP network.

What is claimed is:

1. An admission control system for a set of networks comprising a first network, using a protocol at a sub-IP level, comprising border routers interconnected by links associated with resources of known characteristics and managed by a first network management system, and a second network connected to said first network and of a different type from said first network, the system comprising:
    a first network level admission control apparatus including control means fed by said first network management system with data representative of said links between border routers of said first network and of said resources, said data comprising restoration data which define restoration links and associated resources; and
    a second network level admission control apparatus connected to a second network management system managing said second network,
    wherein said control means
        receives a request to transfer a call via said first network, said call being associated with at least one service criterion and designating said second network, said at least one service criterion comprising ability to protect/restore a link;
        determines, using said data, whether available resources exist that satisfy said at least one service criterion; and
        if said resources exist, forwards said call transfer request to said second network level admission control apparatus;
    wherein said second network level admission control apparatus verifies whether available network resources exist in association with links previously established by the second network management system within said second network so as to satisfy said at least one service criterion,
    wherein said resources are booked only if said resources are available so as to satisfy said at least one service criterion in each of the networks servicing said call.

2. The system according to claim 1, wherein said at least one service criterion further comprises a criterion selected from a group comprising quality of service and security.

3. The system according to claim 2, wherein said quality of service is defined by at least one parameter selected from a group comprising at least passband, delay, losses, and jitter.

4. The system according to claim 1, wherein some of said data specifies a mode of management for a link by said first network management system.

5. The system according to claim 4, wherein said modes are selected from a group comprising at least VPN, optical VPN, and IPSec.

6. The system according to claim 1, comprising:
    memory, in which said control means stores received data in the form of a connectivity matrix between border routers of the first network.

7. The system according to claim 1, wherein said control means are coupled to third control apparatus connected to a third network management system managing a third network connected to the first network and of a different type, and from which said call transfer request comes.

8. The system according to any one of claims 1 to 3, wherein at least one of said second and third networks uses an IP level protocol.

9. The system according to any one of claims 1 to 3, wherein at least one of said second and third networks uses a protocol at sub-IP level.

10. A method for network level admission control, comprising:
    employing the system according to claim 1 in sub-IP networks selected from a group comprising space-division switching networks, WDM networks, TDM networks, and GMPLS networks.

* * * * *